ent Office 2,825,357
Patented Mar. 4, 1958

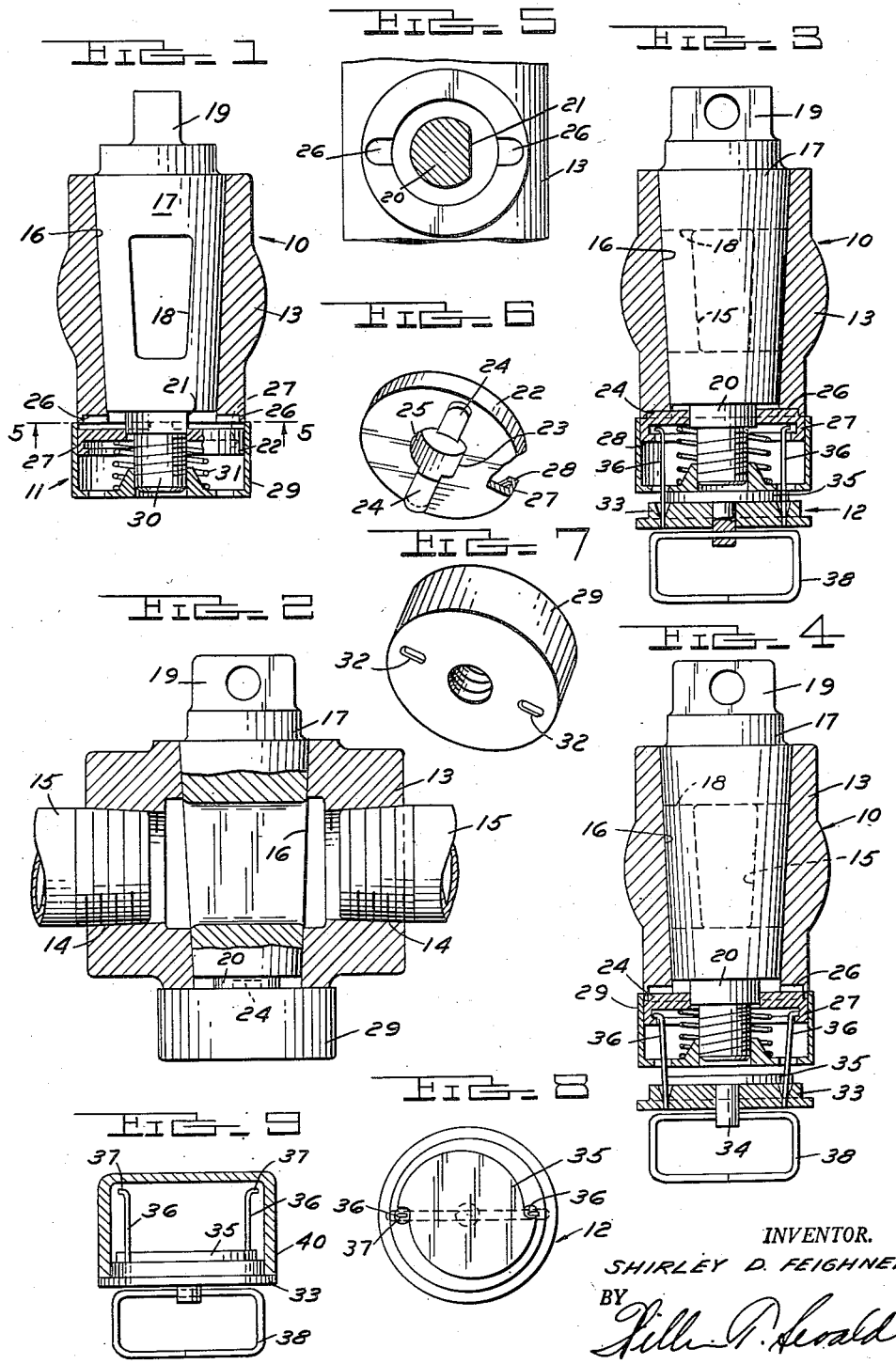

2,825,357
LOCKING VALVE AND KEY

Shirley D. Feighner, Birmingham, Mich., assignor, by mesne assignments, to Olive M. Feighner Application April 8, 1953, Serial No. 347,449

6 Claims. (Cl. 137—385)

This invention relates to valves and more particularly to self-locking valves for use in controlling the flow of gas, air, oil, water, or any fluid or fluid-like solid and which may not be unlocked without the use of a special key.

Public utilities supplying consumers with gas and the like must direct the commodity through pipes or conduits to the consumer. The only way in which the utility can ascertain the amount of gas or the like being used by the consumer is to cause the gas to be conducted through a meter which registers the amount passed therethrough.

It frequently happens that service must be discontinued for a time and to prevent unauthorized use of the gas, a valve is provided adjacent the meter which, when turned to its off position, prevents any gas from flowing through the meter to the consumer. When it becomes necessary to discontinue service, the valve is turned to its off position and usually wired and sealed in its closed position. The wiring and sealing of the valve does not prevent some unauthorized person from breaking the wire and seal and opening the valve so that gas is again available. Of course, it will be readily apparent that unauthorized use is being made of the gas once it is discovered that the seal and wire have been broken and the valve opened, but it may be a substantial length of time before this is discovered unless the utility maintains a staff of employees who do nothing but inspect turned off gas lines. The expense of maintaining such a staff is prohibitive and, as a result, public utilities lose vast sums of money annually through the unauthorized use of their commodities. The result of these losses is to increase the cost of gas to all consumers to provide a cushion for the losses and thus adversely affect all consumers.

With the foregoing in view it is an object of this invention to provide a tamper-proof self-locking valve for gas lines and the like which, when closed, may not be reopened except by an authorized person.

Another object of the invention is to provide a self-locking valve which automatically locks closed when turned to the closed position.

Another object of the invention is to provide a novel lock for a gas valve or the like which requires a special key to unlock the valve.

Another object of the invention is to provide a novel lock for a gas valve or the like which requires not only a special key but also a particular operation thereof to unlock the valve.

A further object of the invention is to provide a special key adapted to be used to unlock the valve.

A further object of the invention is to provide a special key which is cam actuated to unlock the valve.

A further object of the invention is to provide a carrying case for the special key.

A still further object of the inventon is to provide a novel lock which may be installed with little difficulty and expense on valves which already are in use.

These and other objects and advantages of the invention will be specifically pointed out or will become apparent from a reading of the specification considered in connection with the accompanying drawing in which:

Fig. 1 is a cross-sectional end view of the self-locking valve;

Fig. 2 is a cross-sectional front elevation of the self-locking valve shown in Fig. 1;

Fig. 3 is a cross-sectional end view similar to Fig. 1 and showing the key inserted into the locking mechanism of the valve;

Fig. 4 is a view similar to Fig. 3 but showing the key holding the locking mechanism in the unlocked position;

Fig. 5 is a cross-sectional bottom view of the valve taken on the line 5—5 of Fig. 1;

Fig. 6 is a broken away perspective view of the locking ring;

Fig. 7 is a perspective view of the locking ring housing;

Fig. 8 is a top plan view of the key; and

Fig. 9 is a cross-sectional view of the key carrying case showing the key disposed therein.

Referring now to the drawing wherein like numerals refer to like and corresponding views throughout the several views, the embodiment of the invention shown therein for illustrative purposes comprises essentially a valve 10, a locking mechanism 11, and a key 12 adapted to unlock the valve when it is locked in its closed position.

More particularly, the gas or the like valve 10 comprises a housing 13 having threaded openings 14 therein into which are threaded gas carrying pipes or conduits 15. The valve housing is provided with a tapered valve core receiving aperture 16 into which a tapered valve core 17 is received and seats thereagainst. The valve core 17 is provided with a rectangular slot 18 therethrough which is adapted to communicate with the conduits 15 when the core 17 is rotated by means of grip 19 so that the slot 18 of the core is aligned with the conduits 15.

The base of the valve core 17 is provided with a stem 20 which is of reduced diameter and which projects beyond the base of the valve housing 13. One side of the stem 20 is ground off to produce a flat surface 21 so that a locking ring 22 having a similar flat portion 23 may be received on the stem 20 and keyed thereto by means of the cooperating flat portion 21 and 23.

Locking ring 22 is provided with two or more of oppositely disposed lugs 24 on either side of the stem receiving aperture 25 and the lugs 24 are adapted to be received in corresponding slots 26 formed in the under side of valve housing 13 to lock the valve as will be fully explained subsequently. Locking ring 22 is also provided with a flange 27 terminating in a bent inwardly lip 28 so that between the inner face of locking ring and the lip 28 there is an inwardly facing groove upon which a purchase may be obtained.

The locking ring 22 is surrounded by a housing cap 29 which may be threaded onto the lower portion 30 of the valve stem 21 to abutting relationship with valve housing 13 and then welded or otherwise suitably permanently secured to the valve stem 21. The housing cap 29 fits snugly against the bottom of the valve housing 13 so that the locking mechanism is completely contained within the cap. Cap housing 29 has a pair of oppositely disposed slots 32 therein as will be seen in Fig. 7 and whose purpose will be explained presently.

A compression spring 31 is interposed between the inner face of the locking ring and the inside of the cap housing 29 and exerts a force against the locking ring which tends constantly to urge locking ring 22 into engagement with the under side of valve housing 13.

Referring now to Figs. 3, 4, 8 and 9, the special key 12 disclosed therein comprises a discular plate 33 of substantially the same diameter as the cap housing 29 and having a stub shaft 34 extending therethrough and revolvably mounting a cam plate 35 thereon. The cam plate is preferably the shape illustrated in Fig. 8 but any configuration which will perform the desired result may be substituted. Extending upwardly from the discular plate 33 and beyond the cam 35 are a pair of oppositely disposed spring fingers 36 terminating in outwardly directed tips or hook portions 37. In the normal position of the key elements, the spring fingers 36 pass by the cam 35 at the point where its diameter is the smallest. The cam is revoluble, however, by means of the stub shaft 34 and finger ring 38 so that revolution of the cam through approximately a quarter turn increases the diameter of the cam adjacent the fingers and pushes them outwardly. Rotating the cam in the opposite direction restores the fingers to their original positions.

The discular plate 33 is recessed along its periphery so that the key may be fitted into a carrying case 40 for convenient carrying without damaging the fingers 36.

The structure of the invention having been fully described, the operation thereof will now be pointed out in detail.

Figs. 1 and 2 illustrate a gas valve or the like which is open to permit gas to flow through a meter (not shown) to a consumer's appliance. It will be noted that the lugs 24 of the locking ring 22 are not received in the slots 26 in the housing 13 but ride on the under face of the housing 13. When it is desired to close the valve, the valve core 17 is turned by means of grip 19, the locking ring 22 turning with the valve core 17 because it is keyed by means of the flat portion 23 to the valve stem 21. When the valve core 17 has been turned 90° from the position shown in Fig. 1 to the position shown in Fig. 3, the lugs 24 are in alignment with the slots 26 in the valve housing 13 at which point the compression spring 31 expands and automatically moves the locking ring upwardly to seat the lugs 24 in the slots 26 to lock the valve. As long as the lugs are in the slots the valve cannot be opened. To open the valve it is necessary to remove the lugs from the slots and to accomplish this the novel key 12 must be used.

The key 12 is removed from its case and the fingers 36 are inserted through the apertures 32 in the cap housing 29 until they abut the inner face of locking ring 22 as shown in Fig. 3. The key is held in this position and the finger ring 38 is rotated approximately one-quarter turn which rotates the cam 35 and expands the fingers 36 outwardly so that the tips 37 thereof project into the recess in the flange of the locking ring and overlie the lip 28 as shown in Fig. 4. With the fingers 36 in the expanded position the key is pulled downwardly by means of the finger ring 38 and the tips of the fingers engage the lip of the locking ring to pull it downwardly against the tension of the spring 31. With the spring thus compressed and the lugs free from the slots 26, the valve stem may be rotated by means of the grip 19 to the open position at which point the downward pull of the key is released, the cam is rotated to its original position which permits the fingers to resume their normal position and be withdrawn from the cap housing. The key may then be turned to its carrying case.

Thus, it will be seen that a special key and a particular mode of operation are required to open the valve once it has been closed. Since unauthorized persons will not be supplied with a key and since the locking mechanism is completely encased within the cap housing which is permanently secured to the valve, it is extremely unlikely that the valve may be reopened by any person not authorized to do so.

While the description of the invention has been concerned primarily with gas valves, it should be understood that it is not intended to limit the scope of the invention solely to gas valves as the construction quite readily lends itself to any system where the flow of fluids or fluid-like solids is desired to be positively controlled.

Although but a single embodiment of the invention has been described in detail, it is obvious that many changes may be made in shape, size, and detail within the scope of the appended claims.

I claim:

1. A locking valve comprising a housing having oppositely disposed openings adapted to be connected between conduits and an opening transverse to the axis of said conduit openings and interconnecting said conduit openings, a valve core having opposite ends disposed in said transverse opening having a passage therein adapted to permit communication between said conduit openings when aligned therewith and to prohibit communication between said conduit openings when disposed transverse thereto, grip means on one end of said core external of said housing for turning said core relative to said housing, a stub on the other end of said core extending outwardly of said housing, a disc surrounding said core stub and keyed thereto for relative rotation therewith and axially slidably disposed relative thereto, a cap welded to said stub enclosing said stub and disc and a portion of said housing, a spring surrounding said stub disposed between said disc and said cap normally urging said disc against said housing, a slot in said housing adjacent said disc, a lug on said disc adapted to lie in said housing slot to prevent relative rotation between said core and said housing, a grooved ring on said disc; said cap having face aperture means; and means insertable through said face aperture means adapted to engage said disc groove ring and to move said disc against said spring so as to withdraw said lug from said slot to permit rotation of said core relative to said housing.

2. In a device as set forth in claim 1, said face aperture means comprising two face apertures; said insertable means comprising a body portion, paired arms extending from said body, oppositely directed prongs on said arms; said arms and prongs being adapted to be inserted into said face apertures so as to align said prongs with said grooved ring, cam means on said body associated with said arms adapted to bend said arms outwardly so as to engage said prongs with said grooved ring, a handle adapted to turn said cam means relative to said arms and to provide means for manually moving said disc axially outwardly of said housing so as to move said lug from said slot.

3. A locking valve comprising a housing having openings adapted to be connected between conduits and a valve core opening interconnecting said conduit openings, a valve core having opposite ends disposed in said core opening having a passage therein adapted to permit communication between said conduit openings when aligned therewith and to prohibit communication between said conduit openings when disposed transverse thereto, grip means on one end of said core external of said housing for turning said core relative to said housing, a stub on the other end of said core extending outwardly of said housing, a disc surrounding said core stub and keyed thereto for relative rotation therewith and axially slidably disposed relative thereto, a cap welded to said stub enclosing said stub and disc, a spring surrounding said stub disposed between said disc and said cap normally urging said disc against said housing, a slot in said housing adjacent said disc, a lug on said disc adapted to lie on said housing slot to prevent relative rotation between said core and said housing, a grooved ring on said disc; said cap having a face aperture means; and means insertable through said face aperture means adapted to engage said disc groove ring and to move said disc against said spring so as to withdraw said lug from said slot to permit rotation of said core relation to said housing.

4. In a device as set forth in claim 3, said face aperture means comprising two face apertures; said insertable means comprising a body portion, at least one arm extending from said body, a prong on said arm; said arm and prong being adapted to be inserted into said face apertures so as to align said prong with said grooved ring, cam means on said body associated with said arm adapted to bend said arm outwardly so as to engage said prong with said grooved ring, a handle adapted to turn said cam means relative to said arm and to provide means for manually moving said disc axially outwardly of said housing so as to move said lug from said slot.

5. A locking valve comprising a housing having openings adapted to be connected between conduits and a valve core socket interconnecting said conduit openings, a valve core having opposite ends disposed in said socket having a passage therein adapted to permit communication between said conduit openings in one position and to prohibit communication between said conduit openings in another position, grip means on one end of said core external of said housing for turning said core relative to said housing, a stub on the other end of said core extending outwardly of said housing, a member surrounding said core stub and keyed thereto for relative rotation therewith and axially slidably disposed relative thereto, a cap welded to said stub enclosing said stub and disc, a spring normally urging said member against said housing, a slot in said housing adjacent said member, a lug on said member adapted to lie in said housing slot to prevent relative rotation between said core and said housing via said keyed member, a catch on said member; said cap having a face aperture; and means insertable through said face aperture adapted to engage said member catch and to move said member against said spring so as to withdraw said lug from said slot to permit rotation of said core relation to said housing.

6. In a device as set forth in claim 5, said insertable means comprising a body portion, at least one arm extending from said body, a prong on said arm; said arm and prong being adapted to be inserted into said face aperture so as to align said prong with said member catch, cam means on said body associated with said arm adapted to bend said arm so as to engage said prong with said catch, a handle adapted to turn said cam means relative to said arm and to provide means for manually moving said member axially outwardly of said housing so as to move said lug from said slot.

References Cited in the file of this patent

UNITED STATES PATENTS

| | | |
|---|---|---|
| 894,716 | Appelberry | July 28, 1908 |
| 2,092,572 | Deane | Sept. 7, 1937 |
| 2,594,141 | Feighner | Apr. 22, 1952 |
| 2,601,783 | Rouse | July 1, 1952 |